US008066557B2

(12) United States Patent
Tarrant

(10) Patent No.: US 8,066,557 B2
(45) Date of Patent: Nov. 29, 2011

(54) GAME FIELD DRESSING TOOL

(76) Inventor: Ronald R. Tarrant, Wilburton, OK (US)

( * ) Notice: Subject to any disclaimer, the term of this patent is extended or adjusted under 35 U.S.C. 154(b) by 0 days.

(21) Appl. No.: 13/077,944

(22) Filed: Mar. 31, 2011

(65) Prior Publication Data

US 2011/0244772 A1 Oct. 6, 2011

Related U.S. Application Data

(60) Provisional application No. 61/282,799, filed on Apr. 1, 2010.

(51) Int. Cl.
*A22C 21/06* (2006.01)
(52) U.S. Cl. ...................................................... 452/107
(58) Field of Classification Search ........ 7/122, 143–147, 7/158, 161, 166; 81/20, 24–26
See application file for complete search history.

(56) References Cited

U.S. PATENT DOCUMENTS

| 1,615,818 | A | | 1/1927 | Misener | |
|---|---|---|---|---|---|
| 2,596,558 | A | * | 5/1952 | Ingram | 7/122 |
| 3,187,354 | A | | 6/1965 | Frisbie | |
| 3,599,255 | A | * | 8/1971 | Carroll, Sr. | 7/138 |
| D300,715 | S | | 4/1989 | Ragoonath | |
| 4,944,203 | A | * | 7/1990 | Miller | 81/24 |
| 5,000,064 | A | * | 3/1991 | McMahon | 81/24 |
| 5,315,724 | A | * | 5/1994 | Trujillo et al. | 7/145 |
| 5,709,031 | A | * | 1/1998 | Van Beek | 30/308.1 |
| 6,298,512 | B1 | * | 10/2001 | Hagen | 7/166 |
| 6,568,016 | B1 | * | 5/2003 | Hoogland | 7/145 |
| 6,739,010 | B1 | * | 5/2004 | Lin | 7/143 |
| 7,051,390 | B2 | * | 5/2006 | van Beek | 7/145 |
| 7,062,809 | B2 | * | 6/2006 | Sheffield | 7/145 |
| 2009/0008617 | A1 | | 1/2009 | Wooley et al. | |

* cited by examiner

*Primary Examiner* — Richard Price, Jr.
(74) *Attorney, Agent, or Firm* — Richard C. Litman

(57) ABSTRACT

The game field dressing tool provides a one-piece tool utilized to dress both small and large game in the field. The tool is fabricated from a suitable rugged metal, such as stainless steel. The tool comprises an elongate handle and a head. The head incorporates a plurality of surface areas adapted to perform different field dressing tasks. A threaded hole is provided in the handle to permit the tool to be converted to a hatchet.

14 Claims, 6 Drawing Sheets

GAME FIELD DRESSING TOOL

CROSS-REFERENCE TO RELATED APPLICATION

This application claims the benefit of U.S. Provisional Patent Application Ser. No. 61/282,799, filed Apr. 1, 2010.

BACKGROUND OF THE INVENTION

1. Field of the Invention

The present invention generally relates to small tools and accessories for hunters, and particularly to a game field dressing tool that provides a multi-use tool having special applications for dressing game.

2. Description of the Related Art

To inhibit the spread of bacteria and prevent the spoilage of meat, it is often necessary to dress hunted game in the field immediately after the game is killed. Bacterial growth occurs rapidly in the internal organs or viscera of the dead game animal, and thus total removal of the viscera and visceral fluids from the abdomen and thorax is necessary to prevent the above-mentioned spoilage. Removal of viscera is referred to as evisceration or, more commonly, gutting. A sharp knife must be employed to cut the game's hide and flesh to accomplish the evisceration/gutting.

Since a portion of the viscera resides under the bones of the brisket and pelvic areas, a tool to break these bones is also required to accomplish an efficient evisceration/gutting. Heretofore, hunters have usually relied on several individual tools (knives, hatchets, saws, hammers, etc.) to accomplish a field dressing. Attempts to combine the several tools into a single tool have proven ineffectual. The hunting fraternity would certainly welcome a single tool that could be employed to efficiently dress game carcass in the field. Thus, a game field dressing tool solving the aforementioned problems is desired.

SUMMARY OF THE INVENTION

The game field dressing tool is a one-piece tool utilized to dress both small and large game in the field. Although stainless steel is preferred, the tool may be fabricated from other rugged materials if suitable. The tool comprises an elongate handle and a head. The head incorporates a plurality of surface areas adapted to perform different field dressing tasks. A threaded hole is provided in the handle to permit the tool to be converted to a hatchet.

Accordingly, the invention presents a one-piece tool that is compact, versatile, and rugged. The tool incorporates a combination of surfaces that can be employed to efficiently and completely field dress game. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
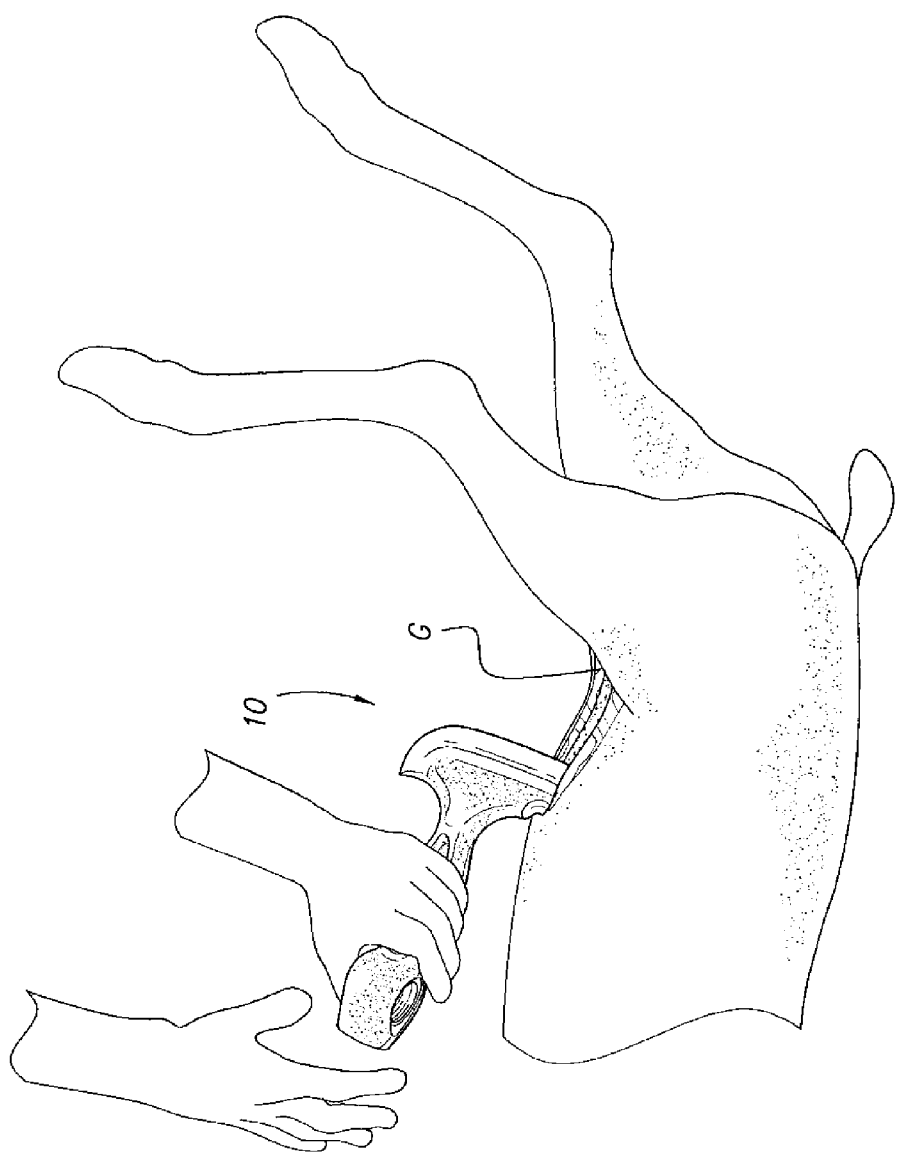
FIG. 1 is an environmental, perspective view of a game field dressing tool illustrating a gutting technique according to the present invention.
Figure 2:
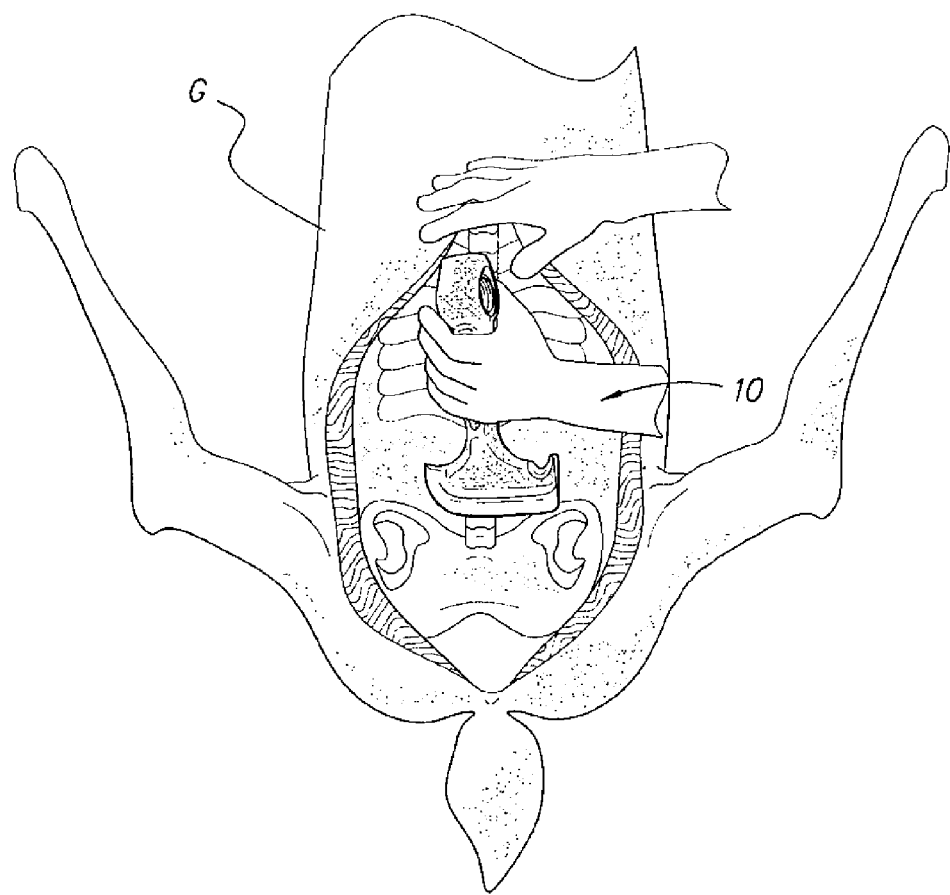
FIG. 2 is an environmental, perspective view of a game field dressing tool illustrating a bone-breaking technique according to the present invention.
Figure 3:
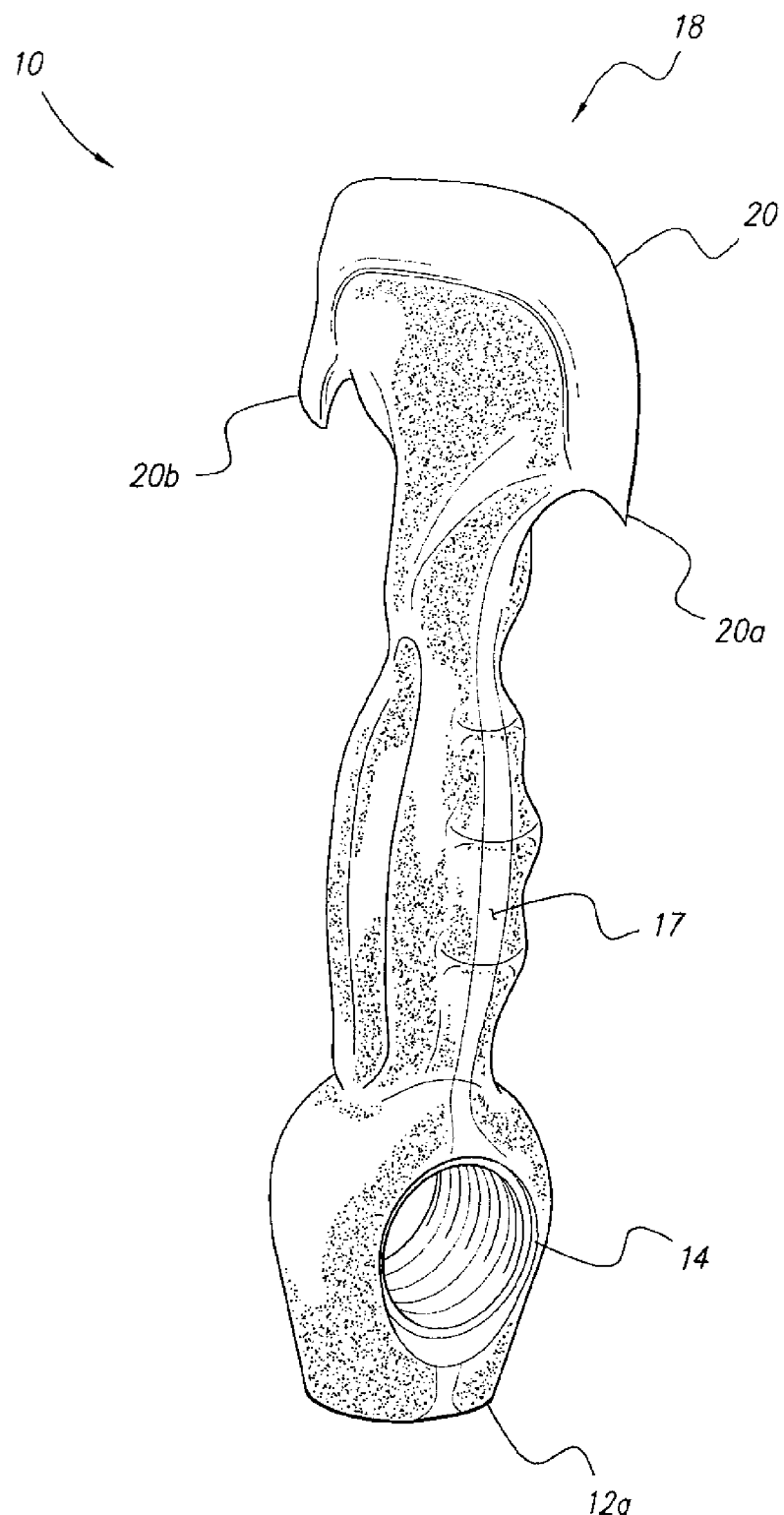
FIG. 3 is a front, perspective view of a game field dressing tool according to the present invention.
Figure 4:
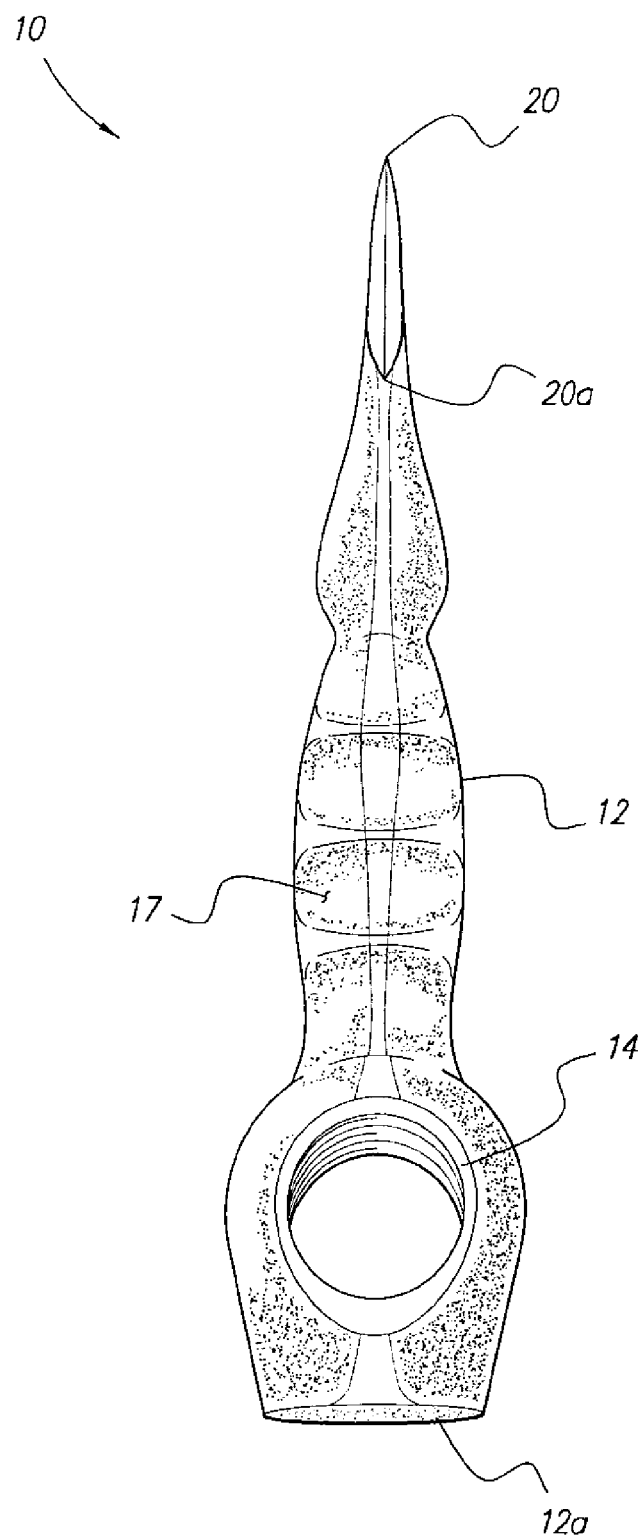
FIG. 4 is an end view of a game field dressing tool according to the present invention.
Figure 5:
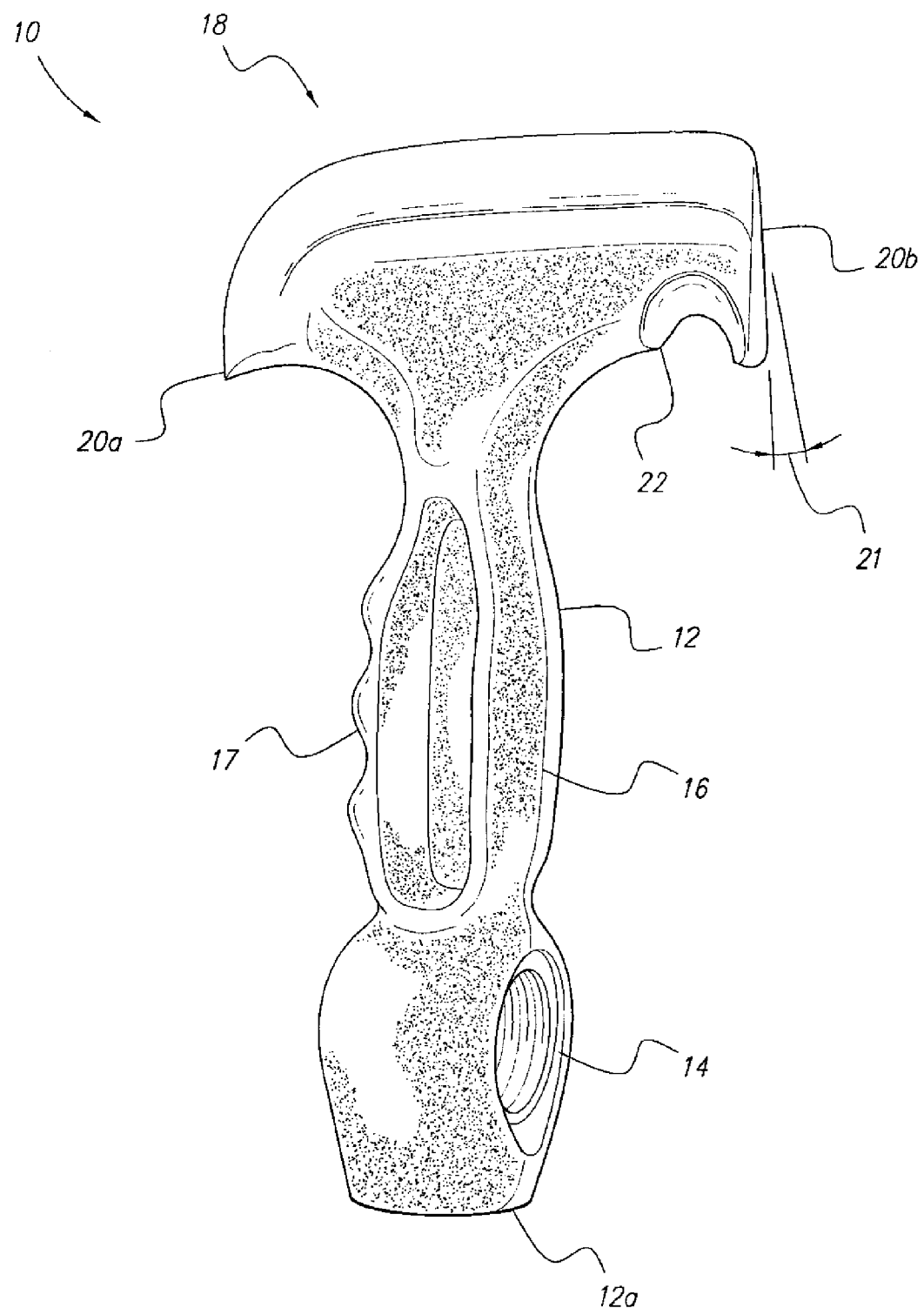
FIG. 5 is a side, perspective view of a game field dressing tool according to the present invention.

Referring to FIGS. 1-6, the game field dressing tool 10 is utilized to dress the carcass of a game animal G while in the field. The tool 10 is of one-piece construction and comprises a handle 12 having a first end 12a. The first end 12a is formed with a thick planar surface that allows the end 12a to be struck with a heavy object in hammer-like fashion. The first end 12a is tapered to provide a clean smooth surface having no sharp edges. A threaded hole 14, whose purpose will be explained below, is formed through the handle adjacent the first end 12a. The threaded hole 14 has a diameter of approximately ¾". A plurality of longitudinal grooves 16 are formed on the handle 12 to permit comfortable grasping thereof. The handle is also provided with ergonomically shaped finger grooves 17 on one edge to facilitate grasping.

The second end of the handle 12 terminates in a compound tool head, generally indicated at 18. The head 18 incorporates a cutting edge 20 having a toe 20a and a heel 20b. The toe 20a is rounded to enhance the skinning and quartering functions when dressing the game G. The cutting edge 20 stops at the heel 20b. A gut hook member 22 is disposed on a side of the head 18 opposite the cutting edge 20 and adjacent the heel 20b. The hook member 22 has an arc-shaped, sharpened edge approximately five-eighths inches in diameter and is utilized to efficiently cut the game animals hide when opening the abdominal area. The hook is also used to split the hide vertically along the inside of the leg so that the hide may be removed. This allows the meat to cool and helps prepare the meat for butchering.

Figure 6:
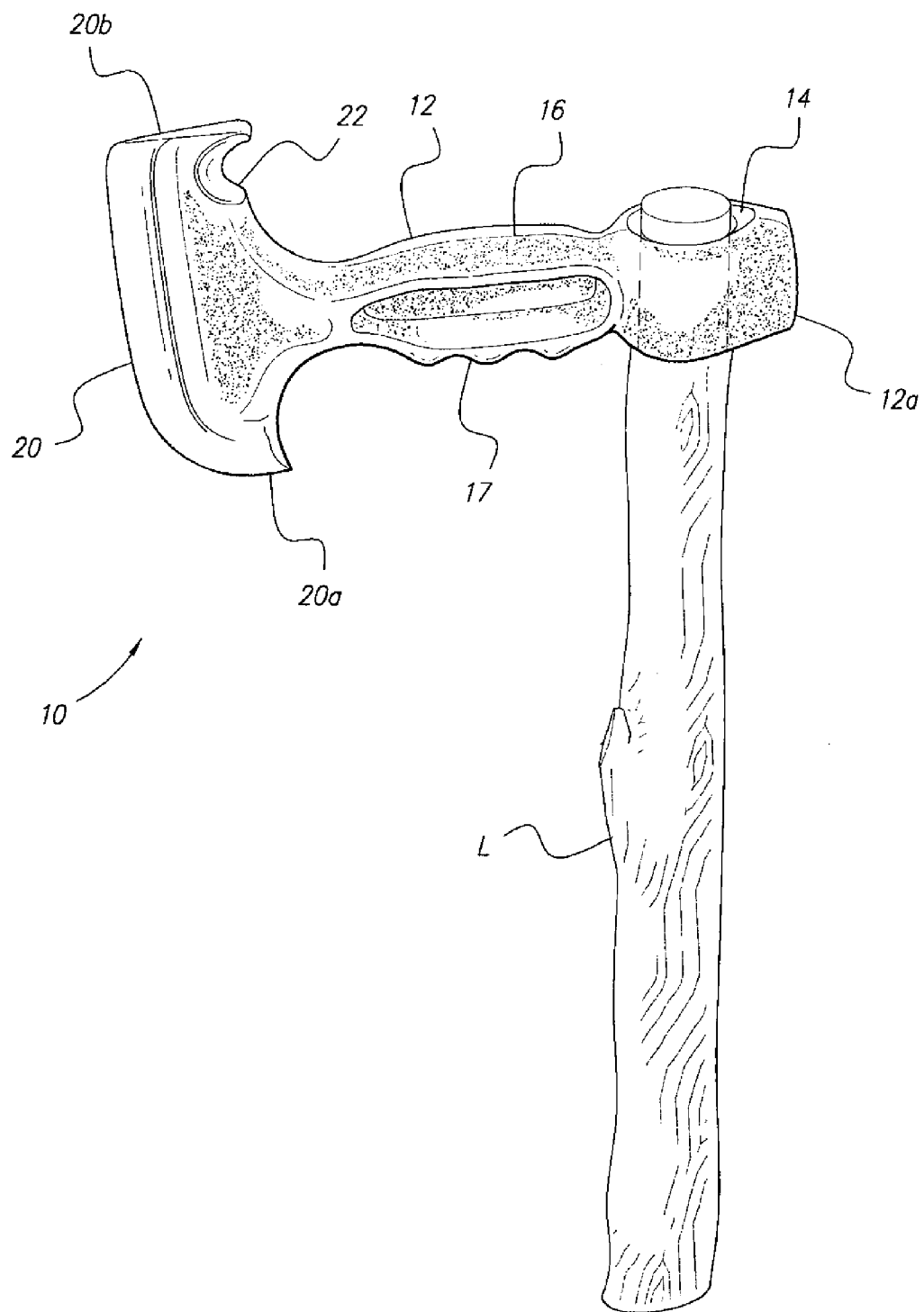
FIG. 6 is a side view of a game field dressing tool according to the present invention, shown configured for use as a hatchet.

The heel 20b forms a small vertical angle 21 (shown n FIG. 5) to prevent the cutting edge from contacting the viscera when the gut hook 22 is used to open the hide of the game. Using the tool as a chisel (FIG. 2), one can cut through the pelvic bone, which will allow removal of the end of the gut in a clean and complete manner. By the same means, one can cut free the leg joint from the hip joint, cutting the cartilage and bone at the joint, then using the cutting edge, slice through the meat to separate the leg from the body (quartering). As best seen in FIG. 6, a small limb L can be inserted into the opening 14 to allow the tool 10 to be used as a hatchet.

It is to be understood that the present invention is not limited to the embodiments described above, but encompasses any and all embodiments within the scope of the following claims.

I claim:

1. A game field dressing tool, comprising:
a handle having a first end and a second end, the first end defining a planar surface, the handle having an opening formed therein adjacent the first end;
a compound tool head defining the second end of the handle;

a cutting edge formed on the compound tool head, wherein a toe portion defines one end of said cutting edge and a heel portion defines a second end of said cutting edge; and a gut hook formed on the compound tool head, wherein said gut hook is positioned adjacent the heel portion.

2. The game field dressing tool according to claim 1, wherein said handle has a plurality of longitudinal grooves formed therein to facilitate grasping.

3. The game field dressing tool according to claim 1, wherein said handle has ergonomically shaped finger grooves formed therein to facilitate grasping.

4. The game field dressing tool according to claim 1, wherein said gut hook has an arc-shaped, sharpened edge.

5. The game field dressing tool according to claim 1, wherein said handle is fabricated from stainless steel.

6. The game field dressing tool according to claim 1, wherein the opening adjacent said first end is a threaded opening.

7. The game field dressing tool according to claim 1, wherein said heel portion is slightly angled.

8. A game field dressing tool, comprising:
a one-piece handle having a first end and a second end, the first end defining a planar surface, the handle having a threaded opening formed therein adjacent the first end;
a compound tool head defining the second end of the handle;
a cutting edge formed on the compound tool head, wherein a toe portion defines one end of said cutting edge and a heel portion defines a second end of said cutting edge; and
a gut hook formed on the compound tool head, the gut hook having an arc-shaped, sharpened edge, wherein said gut hook is positioned adjacent the heel portion on a side of said head opposite to said cutting edge.

9. The game field dressing tool according to claim 8, wherein said handle has a plurality of longitudinal grooves formed therein to facilitate grasping.

10. The game field dressing tool according to claim 8, wherein said handle has ergonomically shaped finger grooves formed therein to facilitate grasping.

11. The game field dressing tool according to claim 8, wherein said handle is fabricated from stainless steel.

12. The game field dressing tool according to claim 8, wherein said heel portion is slightly angled.

13. A game field dressing tool, comprising:
a one-piece handle fabricated from stainless steel, the handle having a first end and a second end, the first end defining a planar surface, the handle having a threaded opening formed therein adjacent the first end;
a plurality of longitudinal grooves formed in the handle to facilitate grasping thereof;
a plurality of ergonomically shaped finger grooves formed in the handle to facilitate grasping thereof;
a compound tool head defining the second end of the handle;
a cutting edge formed on the compound tool head, wherein a toe portion defines one end of said cutting edge and a heel portion defines a second end of said cutting edge; and
a gut hook formed on the compound tool head, the gut hook having an arc-shaped, sharpened edge, wherein said gut hook is positioned adjacent the heel portion on a side of said head opposite to said cutting edge.

14. The game field dressing tool according to claim 13, wherein said heel portion is slightly angled.

* * * * *